United States Patent
Chu et al.

(10) Patent No.: US 8,582,906 B2
(45) Date of Patent: Nov. 12, 2013

(54) IMAGE DATA COMPRESSION AND DECOMPRESSION

(75) Inventors: Wai C. Chu, San Jose, CA (US); David J. Pattridge, Shreveport, LA (US)

(73) Assignee: AOD Technology Marketing, LLC, Tulsa, OK (US)

( * ) Notice: Subject to any disclaimer, the term of this patent is extended or adjusted under 35 U.S.C. 154(b) by 912 days.

(21) Appl. No.: 12/716,839

(22) Filed: Mar. 3, 2010

(65) Prior Publication Data

US 2011/0216969 A1 Sep. 8, 2011

(51) Int. Cl.
*G06K 9/36* (2006.01)
*G06K 9/00* (2006.01)

(52) U.S. Cl.
USPC .......... 382/239; 382/166; 382/173; 382/180; 382/232; 382/243; 348/14.13

(58) Field of Classification Search
USPC ........... 382/239, 166, 173, 180, 232, 243; 348/14.13
See application file for complete search history.

(56) References Cited

U.S. PATENT DOCUMENTS

| | | | |
|---|---|---|---|
| 4,075,658 A | | 2/1978 | de Cosnac et al. |
| 4,584,597 A | * | 4/1986 | Guichard ............... 375/240.01 |
| 4,856,075 A | | 8/1989 | Smith |
| 5,014,198 A | | 5/1991 | Umemura |
| 5,172,237 A | | 12/1992 | Blonstein et al. |
| 5,333,212 A | * | 7/1994 | Ligtenberg .................. 382/250 |
| 5,392,362 A | | 2/1995 | Kimura et al. |
| 5,758,042 A | * | 5/1998 | Deschuytere ............... 358/1.15 |
| 5,854,857 A | | 12/1998 | de Queiroz et al. |
| 5,915,044 A | | 6/1999 | Gardos et al. |
| 6,163,625 A | * | 12/2000 | Ng et al. ..................... 382/239 |

(Continued)

FOREIGN PATENT DOCUMENTS

CN 1852437 10/2006
JP 2006093880 4/2006

(Continued)

OTHER PUBLICATIONS

Bartkowiak, et al. "High Compression of Chrominance Exploiting its Correlation with Luminance." European Signal Processing Conference. 9. (1998): 1-4. Print.*

(Continued)

*Primary Examiner* — Michael A Newman
(74) *Attorney, Agent, or Firm* — Meyertons Hood Kivlin Kowert & Goetzel, P.C.; Jeffrey C. Hood; Joel L. Stevens

(57) ABSTRACT

Compression and decompression of image data, including a first image of an object. The first image may be divided into portions. For each portion, it may be determined whether the portion includes a part of the object. The image data may be compressed based on said determining. If a threshold ratio of portions that do not include a part of the object is reached, portions including a part of the object may be compressed according to a first compression method and portions not including a part of the object may not be compressed, where background information is stored for the portions not including a part of the object. If the threshold ratio of portions that do not include a part of the object is not reached, each portion of the object may be compressed according to the first compression method. The compressed data may be decompressed in a reverse fashion.

62 Claims, 9 Drawing Sheets

(56) References Cited

U.S. PATENT DOCUMENTS

| | | | |
|---|---|---|---|
| 6,285,458 B1* | 9/2001 | Yada | 358/1.15 |
| 6,593,955 B1* | 7/2003 | Falcon | 348/14.01 |
| 6,594,385 B2 | 7/2003 | Grohs et al. | |
| 6,810,079 B2* | 10/2004 | Itokawa | 375/240.08 |
| 6,865,291 B1* | 3/2005 | Zador | 382/166 |
| 6,879,723 B1* | 4/2005 | Helman | 382/232 |
| 7,024,039 B2 | 4/2006 | Simard et al. | |
| 7,139,433 B2* | 11/2006 | Li | 382/232 |
| 7,149,442 B2 | 12/2006 | Ushijima et al. | |
| 7,158,669 B2 | 1/2007 | Tanaka et al. | |
| 7,184,589 B2 | 2/2007 | Okubo et al. | |
| 7,212,680 B2 | 5/2007 | Shin | |
| 7,343,046 B2* | 3/2008 | Curry et al. | 382/243 |
| 7,376,277 B2 | 5/2008 | Withers et al. | |
| 7,418,134 B2* | 8/2008 | Schwartz et al. | 382/173 |
| 7,526,125 B2 | 4/2009 | Drebin et al. | |
| 7,606,429 B2 | 10/2009 | Aleksic et al. | |
| 7,657,103 B2 | 2/2010 | Bottou et al. | |
| 7,668,382 B2 | 2/2010 | Wu et al. | |
| 7,923,065 B2 | 4/2011 | Murakami | |
| 8,345,983 B2 | 1/2013 | Noguchi et al. | |
| 2005/0069197 A1* | 3/2005 | de Queiroz et al. | 382/162 |
| 2006/0274381 A1 | 12/2006 | Simard et al. | |
| 2007/0071333 A1* | 3/2007 | Strom et al. | 382/239 |
| 2007/0237408 A1 | 10/2007 | Yasunaga | |
| 2008/0175476 A1 | 7/2008 | Ohk et al. | |
| 2008/0225327 A1* | 9/2008 | Smith | 358/1.15 |
| 2009/0046931 A1 | 2/2009 | Xiao et al. | |
| 2010/0046614 A1 | 2/2010 | Choi et al. | |

FOREIGN PATENT DOCUMENTS

| | | |
|---|---|---|
| JP | 2006344014 | 12/2006 |
| JP | 2007006411 | 1/2007 |
| JP | 2008042345 | 2/2008 |
| JP | 2009060474 | 3/2009 |
| JP | 2009159598 | 7/2009 |
| WO | 03010727 | 2/2003 |
| WO | 2005004062 | 1/2005 |

OTHER PUBLICATIONS

Brooks, et al. "Image Compression using Sparse Colour Sampling Combined with non-linear Image Processing." Proc. SPIE. 6492. (2007): 1-12. Print.*

CCITT, Information Technology—Digital Compression and Coding of Continuous-tone Still Images—Requirements and Guidelines, Recommendation T.81, 1992. 186 pages.

Charilaos Christopoulos, Athanassios Skodras, and Touradj Ebrahimi; The JPEG2000 Still Image Coding System: An Overview, IEEE T on Consumer Electronics, Nov. 2000. 25 pages.

F. Dufaux, G. Sullivan, and T. Ebrahimi, "The JPEG XR Image Coding Standard", IEEE Signal Processing Magazine, pp. 195-204, Nov. 2009.

ITU-T, "Information Technology—JPEG XR Image Coding System: Image Coding Specification", Recommendation T.832, 2009. 221 pages.

Patrice Y. Simard, Henrique S. Malvar, James Rinker, and Erin Renshaw; "A Foreground/Background Separation Algorithm for Image Compression"; Proceedings of the Data Compression Conference; 2004; 10 pages.

* cited by examiner

IMAGE DATA COMPRESSION AND DECOMPRESSION

FIELD OF THE INVENTION

The present invention relates to the field of compression, and more particularly to a method for compressing image data.

DESCRIPTION OF THE RELATED ART

In recent years, data compression has become an important process for various computer files, including text files as well as multimedia files. Most prior art compression methods are devoted to particular types of files (e.g., video files, music files, image files, text files, etc.) and may be lossy (losing information) or lossless (not losing information) in nature. In general, lossless compression methods are used for text files, while lossy compression methods are used for media files.

At the present time the JPEG (Joint Picture Expert Group) standard is the most widely used compression technique for continuous-tone still images. It generally provides good quality, good compression ratio, and requires limited computational resources. Newer standards for image compression include JPEG 2000, which despite its improved capability with respect to JPEG, has not received widespread adoption due largely to its high demand in computational resources. The latest image compression standard is the JPEG XR which is mainly dedicated to high resolution/high quality applications.

E-commerce applications typically rely heavily on compressed digital images for product presentation. Popular websites such as Amazon or Ebay have a huge number of photographs of their available products. Most of the photographs are stored under the JPEG format. Despite the popularity of JPEG, its application to product presentation can be improved. Thus, improvements in image compression are desired.

SUMMARY OF THE INVENTION

Various embodiments are presented of a system and method for performing compression of image data, e.g. product image data.

Image data comprising a first image of an object may be received. The first image may include object pixels (i.e., pixels of the object) and background pixels (i.e., pixels not of the object).

The first image may be divided into portions. For example, the first image may be divided into squares or rectangles, e.g., evenly divided rectangles of the first image. However, other shapes are envisioned, such as pentagons, hexagons, circles, ovals, etc.

For each portion, the method may determine whether the portion includes a part of the object. For example, a portion including at least one object pixel may be considered an "object portion" and a portion not including at least one object pixel may be considered a "background portion". However, in alternate embodiments, thresholds (e.g., values or ratios) may be used to determine whether a portion is an "object portion" or a "background portion".

The image data may be compressed, e.g., based on said determining.

In one embodiment, the method analyzes the previous determination results to determine the relative percentage of portions that are background portions, i.e., portions that include a small or no amount of the object.

In one embodiment, if the percentage (or number) of portions that do not include a part of the object is greater than a threshold ratio, each portion may be assigned information (e.g., a binary value) based on the prior determination. Said another way, if there is a significant amount of background in the first image (and hence the threshold ratio is reached), then there is a benefit for compressing background portions differently than object portions. In one embodiment, the threshold ratio may be between the portions that do not include a part of the object and the total portions (or, alternatively, the portions that do include a part of the object). Accordingly, the image data may be compressed according to a first compression scheme where portions including a part of the object may be compressed according to a first compression method and portions not including a part of the object may be discarded or not be compressed.

If the threshold ratio of portions that do not include a part of the object is not reached (and hence there is an insignificant amount of background in the first image), then the image data may be compressed according to a second compression scheme where each portion of the object may be compressed according to the first compression method. In this case, since the image is comprised almost entirely of the object, with relatively little background, there is no need to use a different compression method for the background portions. Rather, each portion of the object may be compressed according to the first compression method The use of a threshold ratio of portions described above is exemplary only. In some embodiments, the threshold ratio may not be used (i.e., the background portions and object portions may automatically be compressed differently without performing any determinations) or modified. For example, instead of using a ratio of portions, a ratio of background pixels to object pixels may be used instead.

In some embodiments (e.g., as an alternative to the threshold ratio method above), a compression cost method may be used to determine whether to use the first compression scheme or the second compression scheme. For example, if there is a higher cost (e.g., file size) associated with the first compression scheme than the second compression scheme, then the second compression scheme may be used. Alternatively, if there is a lower cost associated with the first compression scheme than the second compression scheme, then the first compression scheme may be used. In some embodiments, the cost may be determined by simply performing the compression according to both schemes and comparing file sizes, and a larger file means higher cost. In this case, the higher file size may be simply discarded.

Thus, in some embodiments, the method may be generalized such that if a compression condition is met (e.g., if the threshold ratio is reached or if the compression cost is lower, among other possible compression conditions), the compression is performed using the first compression scheme. Similarly, if the compression condition is not met (e.g., if the threshold ratio is not reached or if the compression cost is higher), the compression may be performed using the second compression scheme.

In one embodiment, using the first compression method, portions may be compressed by assigning an average chrominance value for each object pixel of the respective portion. However, the first compression method may operate in different or additional manners, as desired. For example, a mapping may be created between luminance and chrominance for the first image. In one embodiment, the mapping may map an average of all chrominance values for a given luminance value to that luminance value. However, where a luminance value does not occur in the image data, a chrominance value may be assigned via interpolation or extrapolation. Alternatively, instead of averaging common chrominance values for a luminance value, a first set of luminance values may be mapped to a common chrominance value and a second set of luminance values are mapped to an interpolated chrominance value.

The first compression method may use the mapping to compress the image data. Accordingly, the compressed image data resulting from the compression may store luminance values for pixels of the first image and may not store chrominance values for pixels of the first image, other than in the mapping.

In one embodiment, background information may be stored for the portions not including a part of the object. The background information may specify a color for the background or may simply be value(s) (such as the previous binary value(s)) identifying each portion that does not include a part of the object.

Finally, the compressed image data may be stored. Additionally, the compressed image data may include information indicating whether the threshold ratio of portions that do not include a part of the object is reached. Where the threshold is reached and where information (e.g., binary values) is assigned for each portion, the compressed image data may include the information. Note that this information may also be compressed in the compressed image data.

In some embodiments, the compressed image data may store color information usable to recreate the object in a plurality of different colors. For example, the color information may include a map between luminance values and chrominance values for each different color. Thus, the creation of the map described previously may be modified or created for each different color.

Additionally, the compressed image data may stores text and/or graphic information that can be displayed on top of the decoded image, e.g., upon decompression. The text and/or graphic information may be provided during compression or may be a part of the original image data, among other possibilities.

In further embodiments, the image data may include a plurality of images. Accordingly, the division, the determination, and the compression may be performed for each image of the plurality of images. However, the mapping between luminance and chrominance may apply to all of the plurality of images.

Various embodiments are presented of a system and method for performing decompression of image data, e.g. product image data.

Compressed image data may be received. The compressed data may be the data compressed previously. For example, the compressed image data may include a first image of an object. As also indicated previously, the compressed image data may include an average chrominance value for each object pixel. Additionally, the compressed data may include a mapping between luminance and chrominance for the first image. Accordingly, the compressed image data may include luminance values for pixels of the first image but may not include chrominance values for pixels of the first image. The mapping may include an average of all chrominance values for a given luminance value. Alternatively, as indicated previously, a first set of luminance values may be mapped to a common chrominance value and a second set of luminance values may be mapped to an interpolated chrominance value.

The method may determine if the compressed image data is divided into portions including parts of the object and portions not including parts of the object. For example, the method may determine if the compressed image data comprises information (e.g., a bit or binary value) indicating that the compressed image data is divided into portions including parts of the object and portions not including parts of the object. Additionally, or alternatively, the method may determine if a binary value exists for each portion, and if so, may read the value, e.g., to determine if each portion is a background portion or an object portion.

Accordingly, the compressed image data may be decompressed based on said determining. In one embodiment, information indicating which portions include a part of the object may be decompressed. Such information may be used to decompress each portion including a part of the object using a first decompression method. Each portion not including a part of the object may be generated based on background information.

However, if the image data is not divided into portions including parts of the object and portions not including parts of the object, each portion may simply be decompressed using the first decompression method.

The decompressed image may be stored.

In further embodiments, the compressed image data may include color information usable to recreate the object in a plurality of different colors. The color information may include a map between luminance values and chrominance values for each different color. Accordingly, the method may further include receiving input (e.g., over a network, such as the Internet) specifying a color of the plurality of different colors and the decompression described previously may be based on the input and may use the color information. Thus, the decompressed image may include the object in the specified color, e.g., for display, possibly over the Internet.

Additionally, as described previously, the compressed image data may include a plurality of compressed images. Accordingly, the determination and the decompression described previously may be applied to each image of the plurality of images. In one embodiment, the mapping between luminance and chrominance may be applicable to all of the plurality of images.

Similarly, the compressed image data may include text and/or graphic information which may be displayed or positioned on top of the decoded image. The text and/or graphic information may be decompressed during the decompression described previously.

In further embodiments, a second image may be used as background of the decoded image, e.g., instead of a background color. In this embodiment, for each background pixel of the first image, a corresponding pixel of the second image may be used. For example, the two images may be of the same dimensions and the corresponding pixel of the second image may have the same relative location as the background pixel of the first image.

BRIEF DESCRIPTION OF THE DRAWINGS

A better understanding of the present invention can be obtained when the following detailed description of the preferred embodiment is considered in conjunction with the following drawings, in which.

Figure 1:
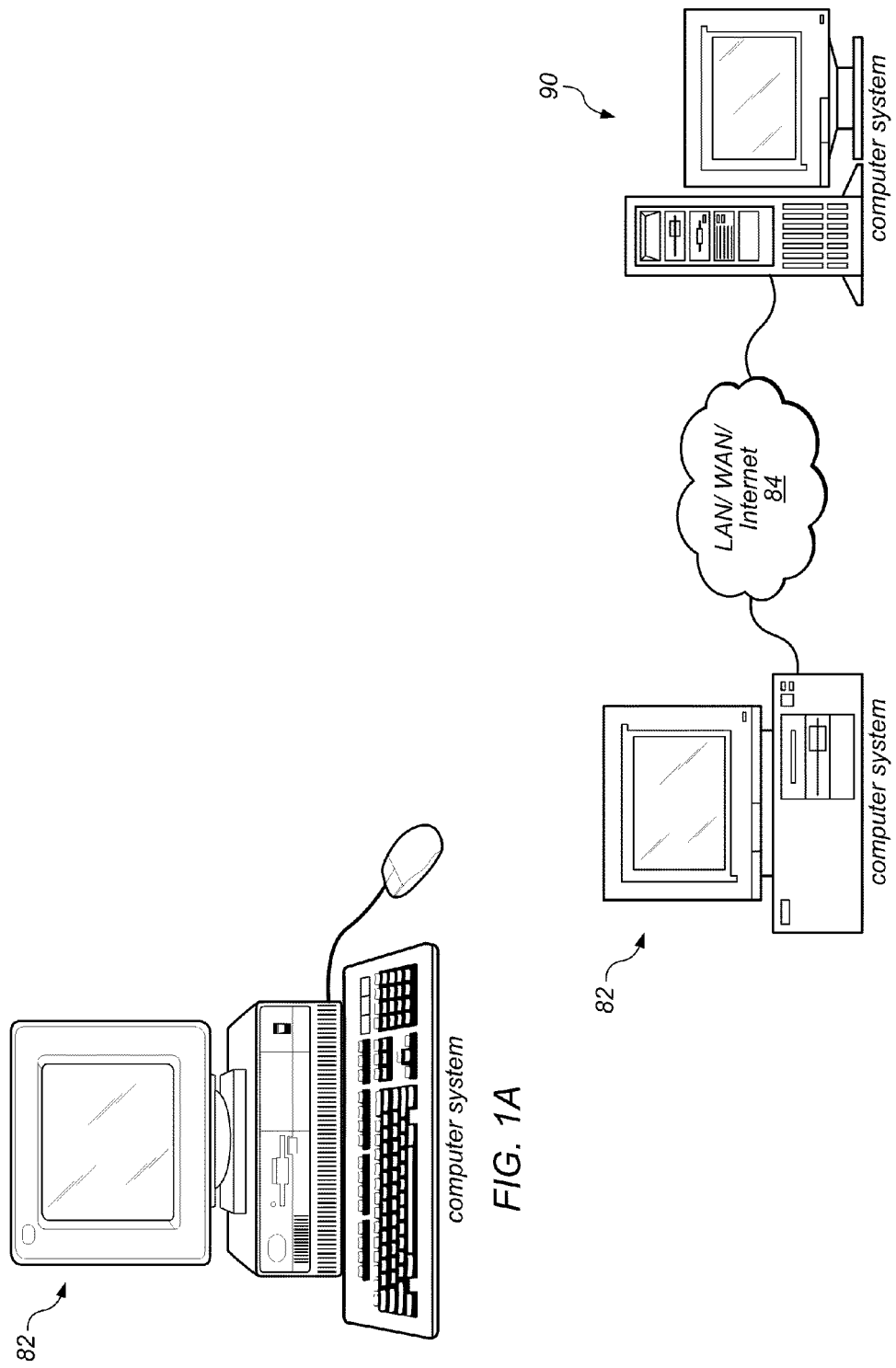
FIG. 1A illustrates a computer system operable to execute a compression algorithm according to an embodiment of the present invention.
FIG. 1B illustrates a network system comprising two or more computer systems that may implement an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described previously, as well as a physical medium that conveys signals such as electrical, electromagnetic, or digital signals, wherein the physical medium may be a bus, network, wire, signal trace and/or other physical transmission medium.

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1A—Computer System

FIG. 1A illustrates a computer system 82 operable to perform image data compression, as described herein.

As shown in FIG. 1A, the computer system 82 may include a display device operable to display text or graphics. The computer system 82 may include at least one memory medium on which one or more computer programs or software components according to one embodiment of the present invention may be stored. For example, the memory medium may store one or more programs which are executable to perform the methods described herein. Additionally, the memory medium may store one or more image files for compression. The memory medium may also store operating system software, as well as other software for operation of the computer system. Various embodiments further include receiving or storing instructions and/or data implemented in accordance with the foregoing description upon a carrier medium.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a compression algorithm in a distributed fashion. In one embodiment, computer 82 may execute a first portion of the compression algorithm and computer system 90 may execute a second portion of the compression algorithm. As another example, computer 82 may compress a binary file stored on (or provided by) the computer system 90 using the compression described herein.

Image Compression

In the descriptions here, systems and methods associated with a new image compression technique are presented. These systems and methods may be particularly beneficial for images dedicated to product presentation. More specifically, the methods described herein may provide substantial reduction in storage requirement with respect to JPEG (or other compression formats) at a similar level of quality. In addition, a number of features are described to make the product presentation more appealing, including 1) viewer selectable color, 2) customizable background, and 3) viewer selectable texts and graphics. These new techniques lead to the much needed reduction in storage and bandwidth, critical to the success of today's e-commerce applications.

Image Data

Figure 2:
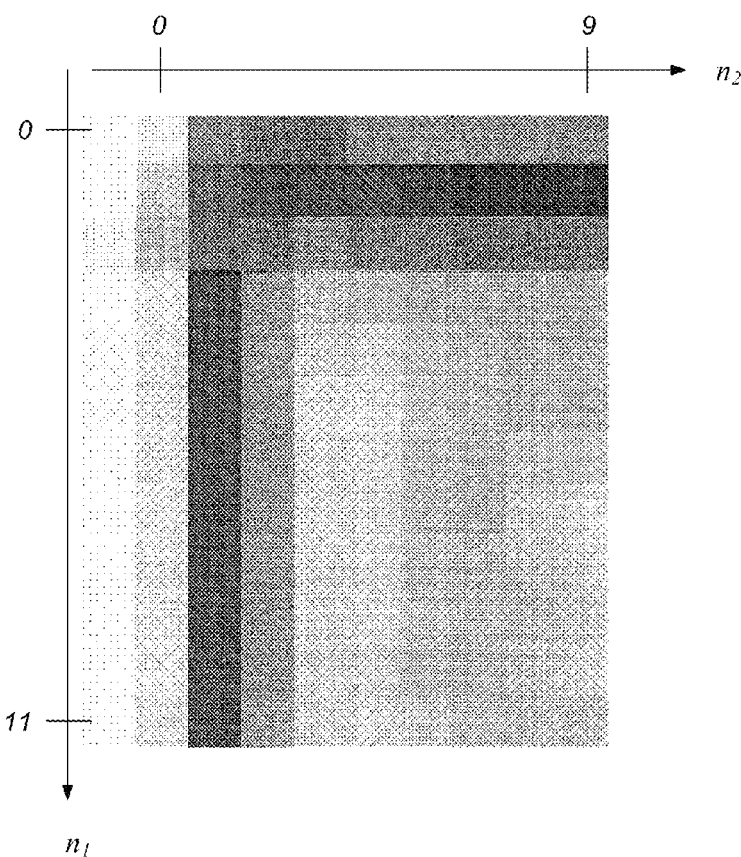
FIG. 2 is an exemplary image array, according to one embodiment.

A digital image (e.g., stored in an image file) can be considered as the two-dimensional array $$x[n_1,n_2], n_1=0 \text{ to } V-1, n_2=0 \text{ to } H-1$$

with V the vertical dimension and H the horizontal dimension. The image is said to have a total of V×H samples, or pixels. At a given location specified by $n_1$ and $n_2$, the image has a certain value given by $x[n_1, n_2]$, and represents the amount of brightness at said location. It is common to use 8 bits to represent the brightness, that is, $x \in [0, 255]$, with x=0 indicating a black pixel and x=255 indicating a white pixel, and the values in between representing different levels of grayness. FIG. 2 illustrates an example of a two-dimensional array with V=12 and H=10, with the elements of the array plotted with various levels of gray.

For color imaging, the color at each pixel is normally specified using three numbers, referred to as "components". For example, in the RGB model, each pixel has three components corresponding to red (R), green (G), and blue (B), with each component represented using 8 bits, leading to a total 24 bits per pixel. In JPEG, a different technique is used which is known as the YCbCr model. The Y component is referred to as the "luminance", and is related to the brightness or intensity at a location; with the color specified by the remaining two components: Cb and Cr, referred to as the "chrominance" components. A simple mathematical relationship exists to convert RGB quantities into YCbCr and vice versa.

In the embodiments described as follow, a model similar to YCbCr may be used, although other models are envisioned. In some embodiments, since human observers are more sensitive toward luminance changes and less sensitive toward chrominance changes, more bits may be allocated to represent the luminance information than chrominance information.

Figure 3:
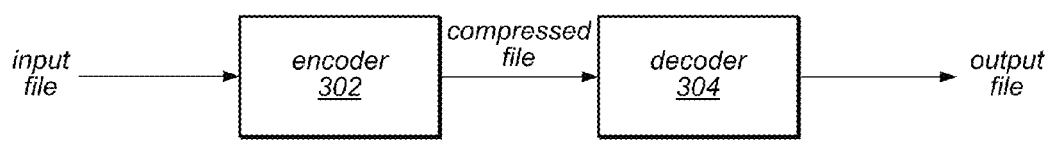
FIG. 3 is an exemplary block diagram of a compressor (encoder) and decompressor (decoder), according to one embodiment.

FIG. 3 shows the block diagram of an image compression system. It is assumed that the images are stored in the form of a file, or a collection of digital data. In the block diagram of FIG. 3, the input image stored in the input image file may be compressed by the encoder 302, producing the compressed file at its output. The compressed file may be processed by the decoder 304 to generate the output file containing the output image, decoded image, or recovered image. In a "lossless" compression system, the output image is identical to the input image, while for a "lossy" compression system, the output image is different from the input image.

Background Marking

Various embodiments for compressing image data may use background marking, as described in the following. Note that the following provides only an exemplary embodiment, and does not limit the invention.

Figure 4:
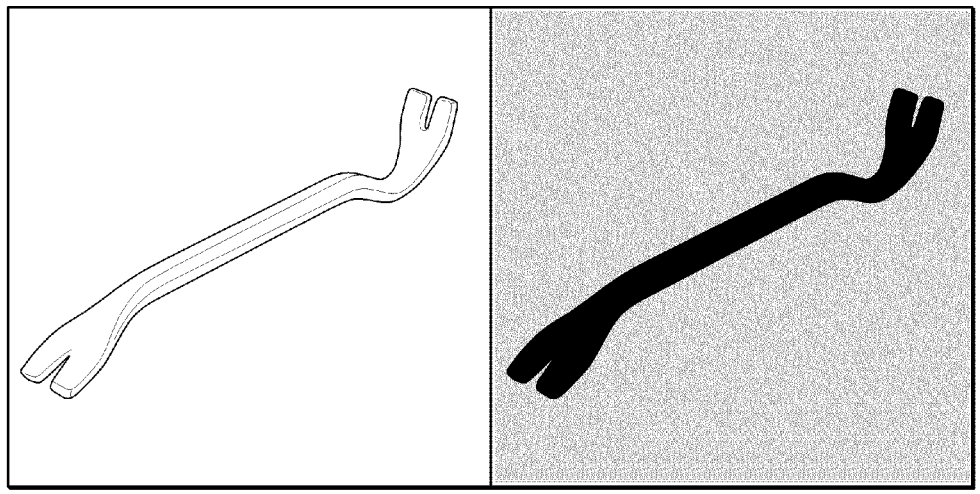
FIG. 4 presents an exemplary image of an object before and after analysis, according to one embodiment.

In many product presentation situations the images consist mostly of the product taken on a background. FIG. 4 shows an example where the pixels of the image can be classified into two types: Object pixels and background pixels; the former belongs to the product (or depicted object) itself while the latter belongs to the background. As shown, the pixels of the crowbar are identified as object pixels and the pixels that are not of the crowbar are identified as background pixels.

In a typical compression approach such as JPEG, there is no distinction between background and object, and the same technique is applied to the entire image. Because the background is of no interest in some images, such as product presentations, avoiding background information storage can increase coding efficiency with no penalty in useful information loss.

Figure 5:
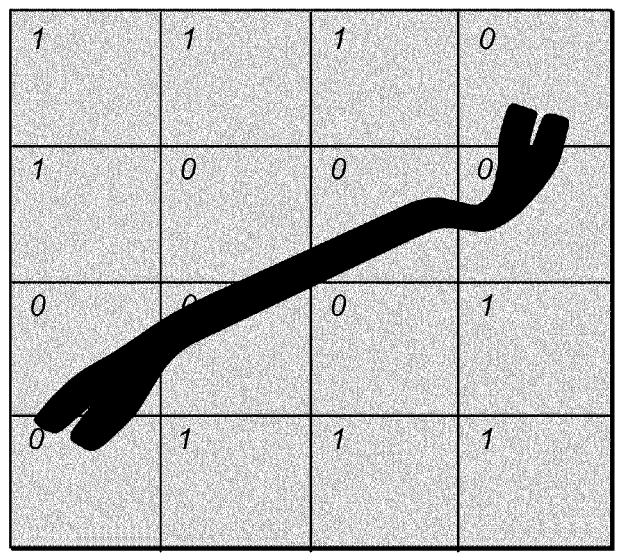
FIG. 5 illustrates the image of FIG. 4 divided into portions and analyzed, according to one embodiment.

In some embodiments, an input may be processed in portions consisting of a small number of pixels. In one embodiment, each portion may be 8×8=64 pixels. Said another way, the image may be divided into square portions having 64 pixels each (although other shapes and sizes are envisioned. In embodiments described herein, a 1-bit flag (e.g., as "background flag") may be assigned to each portion to indicate whether the portion contains object pixels or not. FIG. 5 shows an example where the image of FIG. 4 is divided into 16 portions (4×4) and where portions with object pixels are labeled "0" and portions with no object pixels are labeled "1". Thus, each portion may be classified as an "object portion" or a "background portion". The flags may be determined by the encoder 302, which may become part of the compressed file. Based on the flags, the encoder 302 may apply different techniques to encode each portion. The decoder 304, on the other hand, may rely on the information (e.g., the bits or flags described previously) and apply different techniques to generate the output image.

In various embodiments, a mechanism may be used to turn on or off the storage of classification results and/or a coding method may not be applied for the background. Instead, in one embodiment, a background portion may be filled with default pixel values by the decoder 304. The mechanism described previously may utilize the ratio:

(Number of background portions)/(Total number of portions)

In one embodiment, if the ratio is below a given threshold ratio (e.g., 0.1, although other ratios are envisioned), background portions may be compressed normally (e.g., no background flags may be stored), since, in this case, the cost of storing the flags may offset any benefits obtained through an adaptive coding scheme due to the low number of background portions. Such situations may occur for products that are rectangular in shape and images containing such products are typically adjusted to contain a very small percentage of background pixels.

In one embodiment, an additional parameter may be used to indicate whether the background flags are stored as part of the compressed file. This parameter may be referred to as a "background flag present flag", and can be transmitted with 1 bit. In one embodiment, if this flag has a value of 1, the background flags are transmitted, otherwise no flag may be stored. In this latter case, all portions may be treated as object portions.

Figure 6A:
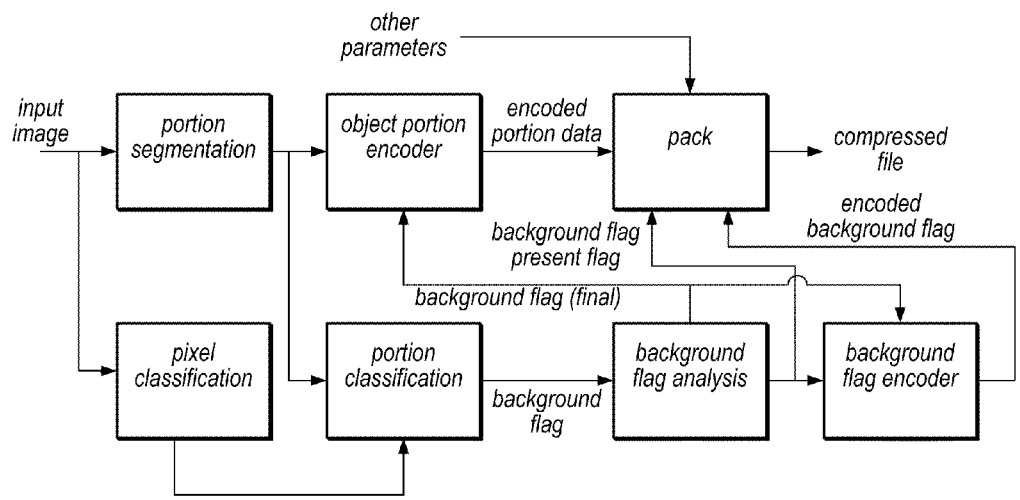
FIGS. 6A and 6B illustrate a block diagram of one embodiment of an image compression system with background marking for the compressor and decompressor, respectively.
Figure 6B:
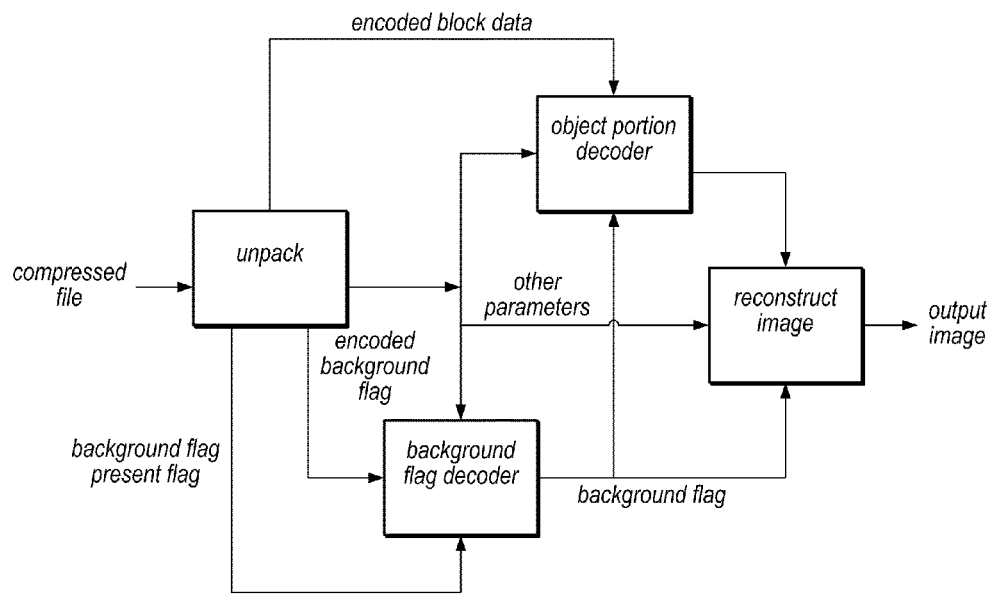

FIGS. 6A and 6B—Image Compression with Background Marking

FIGS. 6A and 6B shows the block diagram of an image compression system with background marking for the compressor and decompressor, respectively. Note that the following provides only an exemplary embodiment, and does not limit the invention.

The input image is first segmented into portions, with each portion consisting of a fixed number of pixels. Each pixel is classified as being an "object pixel" or a "background pixel" by the pixel classification block. The portions are classified as being an "object portion"—if the portion contains one or more object pixels—or a "background portion"—if all pixels belong to the background. A 1-bit flag, referred to as the "background flag", may be assigned to each portion is used to signal this classification result. The background flags may be processed by the background flag analysis block, and based on the number of background portions with respect to the total number of portions, a decision may be made on whether to transmit or store the background flags or not. Information indicative of the decision may be stored as part of the compressed file, e.g., as a bit (e.g., a background flag present flag).

However, if the background flags are not present, then all portions may be assumed to be object portions.

An object portion may be encoded using the object portion encoder resulting in the encoded portion data. The background flags (if available) may all be encoded through a dedicated encoder to produce the encoded background flags. The encoded flags may be packed together with the encoded portion data, the background flag present flag, and other parameters to form the compressed file. Some parameters that need to be stored to the compressed file include the image dimension and specific parameters controlling the operation of various encoders.

At the decoder, the compressed file may be unpacked with the various components used as input to the processing blocks. Whether the encoded background flags are present or not may be derived from the recovered background flag present flag. If the encoder background flags are present, they may be decoded to recover the original background flags, otherwise all portions may be assumed to be object portions. The encoded portion data may be decoded to form the original portion data. The recovered data together with the intended parameters may be used to reconstruct the output image.

Color Quantization

Various embodiments for compressing image data may use color quantization, as described in the following. Note that the following provides only an exemplary embodiment, and does not limit the invention.

Representation of a large set of elements with a much smaller set is called "quantization". Quantization may be particularly applicable in lossy compression systems where a certain parameter or quantity is represented by an approximated version. The main challenge in quantization is to come up with a scheme that provides the best approximation associated with minimal loss.

Many products or objects depicted in images only have a small number of distinct colors, and some only have one color, hence more efficient techniques may be used for images of these products, leading to high compression with small quality degradation. In these cases representative colors, called the quantized colors, may be identified. Since the quantized colors can be transmitted much more efficiently, improvement in compression efficiency is achieved.

In the case of the YCbCr model, the Cb and Cr values may be isolated for the object pixels and an average Cb and an average Cr may be calculated. Accordingly, the decoder 304 may assign the same average value to all object pixels during reconstruction. This simple scheme may generate noticeable artifacts in the reconstructed image; nevertheless, it may be applicable for many products where high fidelity in color reproduction is unnecessary.

Figure 7A:
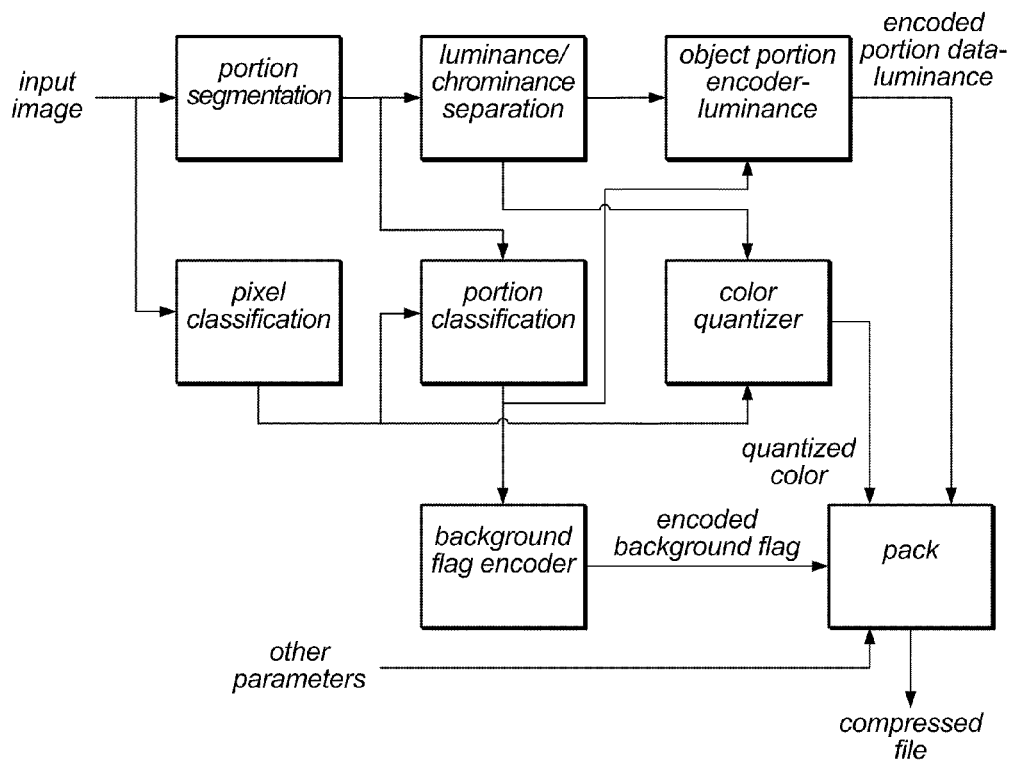
FIGS. 7A and 7B show a block diagram of one embodiment of an image compression system with background marking and color quantization for the compressor and decompressor, respectively.
Figure 7B:
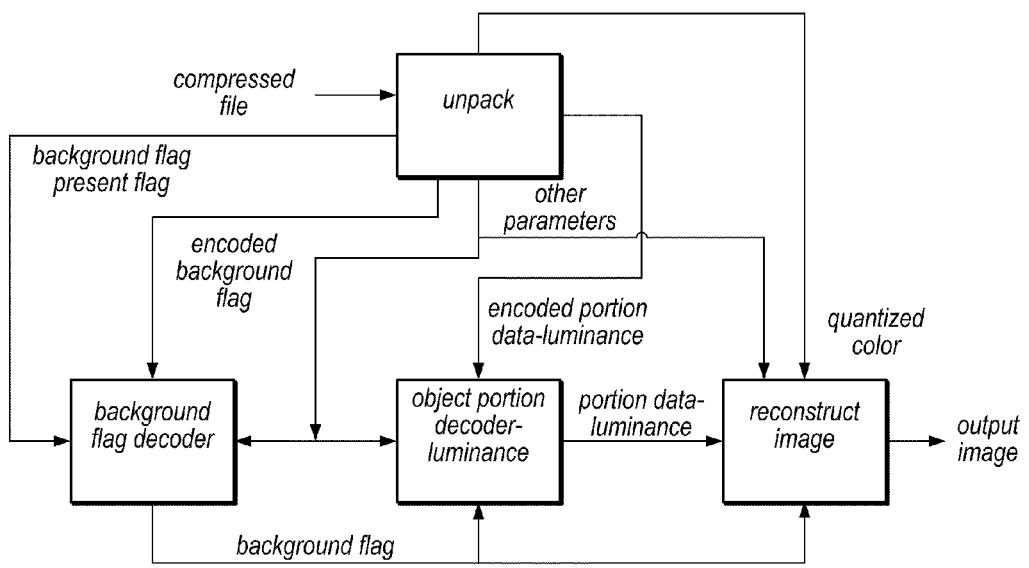

FIGS. 7A and 7B—Image Compression with Background Marking and Color Quantization FIGS. 7A and 7B show a block diagram of an image compression system with background marking and color quantization for the compressor and decompressor, respectively. Note that the following provides only an exemplary embodiment, and does not limit the invention.

The system is suitable for product presentation where the product has only one color. Each pixel is classified as being an object pixel or a background pixel by the pixel classification block. The image is then segmented into a number of portions, the luminance and chrominance information at each portion go through different processing route. For the luminance, it is encoded using the object portion encoder where the results become part of the compressed file. The color quantizer takes the chrominance data corresponding to object pixels to produce one color value referred to as the quantized color. The quantized color is used by the decoder to reconstruct the image, where all pixels have the same color.

In the case of the YCbCr model, the quantized color consists of two components: A quantized Cb value and a quantized Cr value. One way to determine the quantized values is to average all Cb values to obtain an average Cb value, and to do the same with the Cr values. Applying the same average color to all object pixels yield acceptable results for many single-color objects.

Luminance Controlled Chrominance Curves

Various embodiments for compressing image data may use luminance controlled chrominance curves, as described in the following. Note that the following provides only an exemplary embodiment, and does not limit the invention.

For many one-color objects, the chrominance components show some variations with respect to the luminance, and the use of one average chrominance value per object is often insufficient, leading to noticeable artifacts. A better approach is to capture the variation of the chrominance components with respect to the luminance data. Consider the availability of the two arrays:

$$aCb[i], aCb[i], i=0 \text{ to } 255$$

referred to as the "luminance controlled chrominance curves" (LCCC). Then knowing the luminance data being $$Y[n], n=0 \text{ to } N-1$$

where N is the total number of pixels. The chrominance components may be obtained through the LCCC with $$Cb'[n]=aCb[Y[n]], Cr'[n]=aCr[Y[n]], n=0 \text{ to } N-1.$$

In the previous description, the YCbCr components are assumed to be integers represented using 8 bits, hence they are within the range of [0, 255]. Thus, given the luminance value of a pixel, the chrominance values can be read from the LCCCs. In one embodiment, the luminance component may be used as an index to the arrays (the indexing component), with the chrominance components recovered from the arrays (the recovered component). Thus, there may be a one-to-one mapping between the luminance component and the chrominance components.

One possible way of finding the LCCCs based on the YCbCr values $$Y[n], Cb[n], Cr[n], n=0 \text{ to } N-1$$

is through the following pseudocode:

```
1. for k ← 0 to 255
2.    countY[k] ← 0
3. for i ← 0 to N−1
4.    countY[Y[i]] ← countY[Y[i]]+1
5. for k ← 0 to 255
6.    ACb[k] ← 0
7.    ACr[k] ← 0
8. for i ← 0 to N−1
9.    ACb[Y[i]] ← ACb[Y[i]] + Cb[i]
10.   ACr[Y[i]] ← ACr[Y[i]] + Cr[i]
11. for k ← 0 to 255
12.   if countY[k] ≠ 0
13.      ACb[k] ← round(ACb[k] / countY[k])
14.      ACr[k] ← round(ACr[k] / countY[k])
```

In the previous code, the counts of luminance values are found and stored in the array countY (lines 1 to 4). The LCCCs are initialized (lines 5 to 7), which may be used to accumulate the actual chrominance values (lines 8 to 10). The averages are found in lines 11 to 14 where the accumulated chrominance data are divided by the counts. Note that the range of 0 to 255 selected for the index k is due to the number of bits used to represent the YCbCr values. A popular choice is 8-bit per value leading to a total of 256 possibilities. For other bit depths the range may be different.

Figure 8:
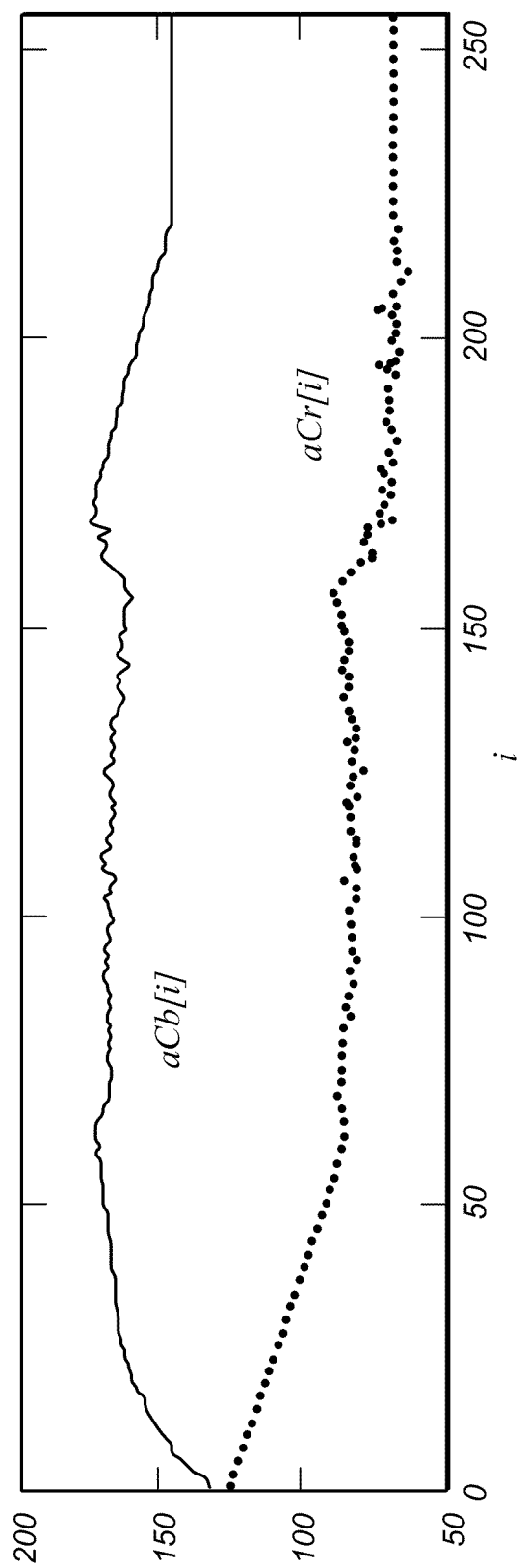
FIG. 8 illustrates exemplary luminance controlled chrominance curves.

In practice, not all luminance values occur in an image, which may lead to zeros appearing in the LCCCs. However, these zeros can be eliminated by extending or interpolating the neighboring values, leading to a smoother curve. Since, in some embodiments, the LCCCs become part of the compressed file, it is advantageous to further compress them so as to reduce the file size. A smoother curve can be more efficiently compressed since correlation among samples is higher. FIG. 8 illustrates examples of LCCCs.

Another way to generate an LCCC is by using a single constant value, such as the quantized color approach described previously. As described previously, in this technique, all elements of the LCCC are equal to the same constant value. This approach, however, often produces undesired color distortion, especially for areas of the object with low luminance. To reduce the distortion, a simple interpolation method may be used so as to ensure that the LCCCs converge to some fixed value when the luminance drops toward zero. Assuming that the components are represented using 8 bits and hence they have a range of [0, 255], it may be ensured that the LCCCs converge to 128 using the following algorithm:

```
1.  M ← 50      // Length of interval having interpolated samples
2.  for n ← M to 255
3.      ACb[n] ← acb // Assign average chrominance values to
        the rest of the samples
4.      ACr[n] ← acr
5.  f ← 1/M     // A fraction used to control the interpolation
6.  r ← 0       // Ratio used in interpolation
7.  for n ← 0 to M−1   // The samples here are interpolated
8.      ACb[n] ← r * acb + (1−r) * 128
9.      ACr[n] ← r * acr + (1−r) * 128
10.     r ← r + f
```

In the previous algorithm, the average chrominance values are denoted by acb and acr. Each LCCC has 256 elements, and M=50 of them are interpolated between the constant average value and the fixed value of 128, while the rest of the 256−M=205 elements are constant and equal to the average value. In this way, both LCCCs converge smoothly toward 128 as n decreases toward 0. Using this method, reproduction of dark areas of an object is often more accurate, with the results closer to the original image. Note that there are 256 elements for the LCCC because it is assumed that the YCbCr values are represented with 8-bit per value. For other bit depths the range may be different.

Figure 9A:
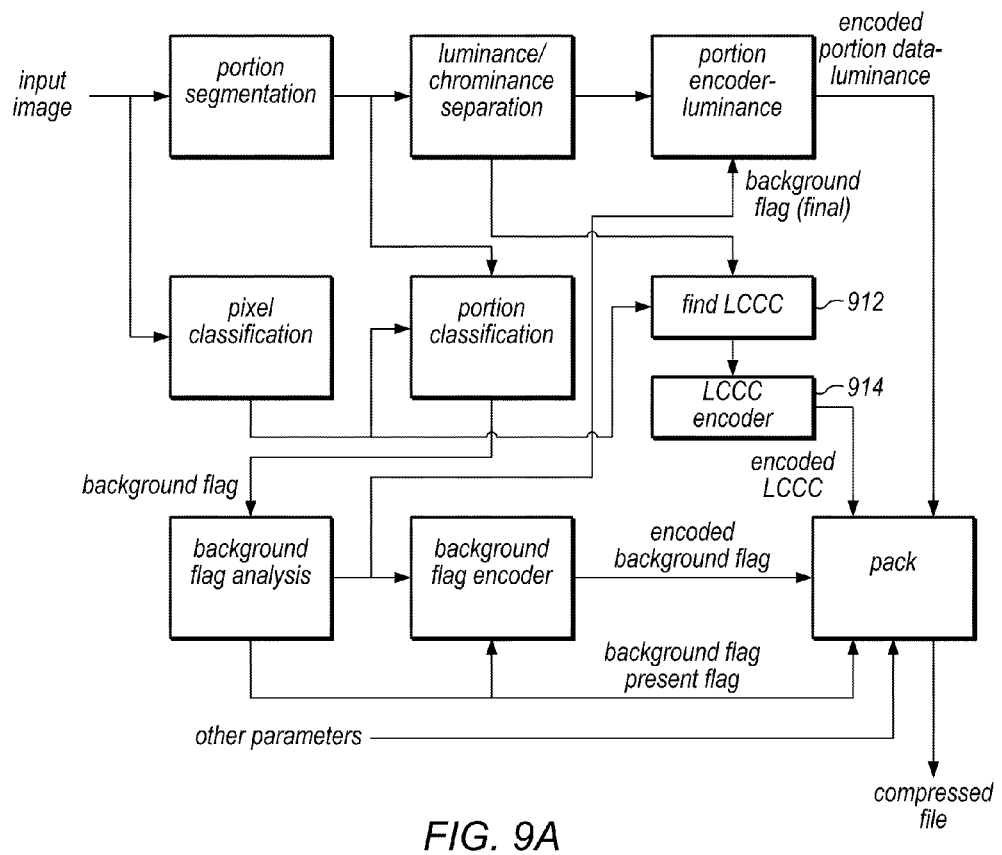
FIGS. 9A and 9B show a block diagram of one embodiment of an image compression system with background marking and use of luminance controlled chrominance curves for the compressor and decompressor, respectively.
Figure 9B:
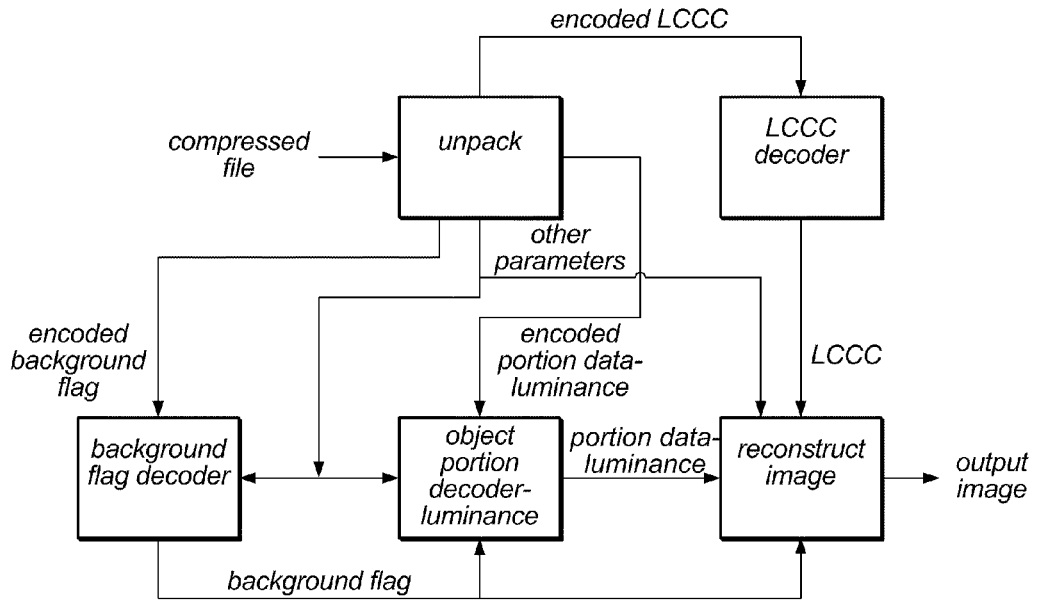

FIGS. 9A and 9B—Image Compression with Background Marking and LCCC

FIGS. 9A and 9B show a block diagram of an image compression system with background marking and use of luminance controlled chrominance curves for the compressor and decompressor, respectively. Note that the following provides only an exemplary embodiment, and does not limit the invention.

It is possible to use the LCCC to achieve better quality in the output image with respect to color quantization. FIGS. 9A and 9B show the block diagram of an image compression system with background marking and LCCC for the compressor and decompressor, respectively. The system is very much like the case of color quantization, with the exception that the chrominance information are used to derive the LCCCs, which are then encoded before packing to form the compressed file.

In the case of the YCbCr model, two LCCCs are available, one for Cb and one for Cr. At the decoder, the chrominance components of a pixel may be recovered from the luminance value and the LCCCs.

Viewer Selectable Color

The following sections describe various features which may be incorporated into any of the systems and methods described herein. Note that the following provides only an exemplary embodiment, and does not limit the invention.

Various embodiments for compressing image data (and the resulting compressed image) may allow for the use of viewer selectable color.

It is common for products to have different colors—for example, a pen seller may offer the exact same pen but with various colors such as red, green, and blue. In order to present products having different colors, the JPEG approach is to separately store one image per color, which is complex to manage and requires excessive storage.

In one embodiment, a compressed image file may include color information so that when the image is decoded (i.e., decompressed), the luminance data can be combined with different chrominance data to form the final image corresponding to the same product having different colors. In one embodiment, the choice of color may be made available to the viewer, or chosen automatically, e.g., by the website presenting the image data, as desired. For example, in one embodiment, the image display mechanism (e.g., the website or software application) may have a button that allows the viewer (e.g., a user) to select an available color of the product.

To support this selectable color feature, all colors of interest may be included in the compressed file. When reconstructing the image, one of the available colors may be combined with the rest of the data to yield the final image. The included colors can be in the form of quantized colors or LCCCs. Alternatively, instead of including the colors of interest, colors may be provided at the time of viewing, and the image may be reconstructed using the new color, in a dynamic fashion. Using either of these techniques (among other possibilities), products having different colors can be summarized with one compressed file.

Multiple Images

The following sections describe various features which may be incorporated into any of the systems and methods described herein. Note that the following provides only an exemplary embodiment, and does not limit the invention.

A recent trend in product presentation is to show images of the products taken at different angles, typically surrounding the product at equally spaced angles. The images taken at different angles are then compressed independently using a scheme such as JPEG. Because the same product viewed at different angles will have same or similar color, a file format may be used where all luminance data from all images (taken at different angles) are stored. Then a number of colors stored as either quantized color or LCCC are packed into the same file. The advantage of such format is that there is no need to have separate color information for different angles, since they are the same or similar.

Similar methods can be applied to show different text, e.g., with a single view or with the multiple views. Thus, different text may be associated with the image and may be selectable, and/or different text may be associated with each view of the image. Note that a "view of the object" may be referred to as an "image". Thus, the image file may contain "a plurality of images", e.g., each referring to a different view of the object.

Figure 10A:
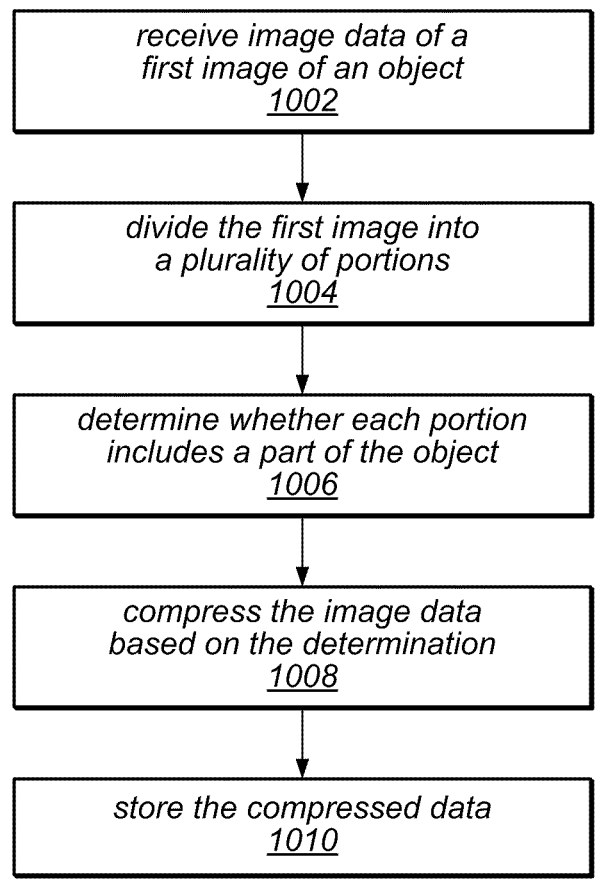
FIGS. 10A and 10B illustrate respective embodiments of methods for compressing image data and decompressing compressed image data.

FIG. 10A—Method for Image File Compression

In the exemplary embodiment shown in FIG. 10A, FIG. 10A illustrates a method for compressing an image file. The method shown in FIG. 10A may be used in conjunction with any of the computer systems or devices shown in the previous Figures, among other devices. In various embodiments, some of the method elements shown may be performed concurrently, in a different order than shown, or may be omitted. Additional method elements may also be performed as desired. As shown, this method may operate as follows.

In 1002, image data comprising a first image of an object may be received. The first image may include object pixels (i.e., pixels of the object) and background pixels (i.e., pixels not of the object). In one embodiment, the image data may be received as an image file, e.g., and stored in a memory medium. The image data may be received over a network (e.g., a LAN or WAN, such as the Internet) in a wired or wireless fashion.

In 1004, the first image may be divided into portions. For example, the first image may be divided into squares or rectangles, e.g., evenly divided rectangles of the first image. However, other shapes are envisioned.

In 1006, for each portion, the method may determine whether the portion includes a part of the object. For example, a portion including at least one object pixel may be considered an "object portion" and a portion not including at least one object pixel may be considered a "background portion". However, in alternate embodiments, thresholds (e.g., values or ratios) may be used to determine whether a portion is an "object portion" or a "background portion".

In 1008, the image data may be compressed based on said determining.

For example, if a threshold ratio of portions that do not include a part of the object is reached, each portion may be assigned information (e.g., a binary value) based on the previous determination. Additionally, portions including a part of the object may be compressed according to a first compression method and portions not including a part of the object may not be compressed.

In one embodiment, using the first compression method, portions may be compressed by assigning an average chrominance value for each object pixel of the respective portion. However, the first compression method may operate in different or additional manners, as desired. For example, a mapping may be created between luminance and chrominance for the first image. In one embodiment, the mapping may map an average of all chrominance values for a given luminance value to that luminance value. However, where a luminance value does not occur in the image data, a chrominance value may be assigned via interpolation or extrapolation. Alternatively, instead of averaging common chrominance values for a luminance value, a first set of luminance values may be mapped to a common chrominance value and a second set of luminance values are mapped to an interpolated chrominance value.

The first compression method may use the mapping to compress the image data. Accordingly, the compressed image data resulting from the compression may store luminance values for pixels of the first image and may not store chrominance values for pixels of the first image, other than in the mapping.

In one embodiment, background information may be stored for the portions not including a part of the object. The background information may specify a color for the background or may simply be value(s) (such as the previous binary value(s)) identifying each portion that does not include a part of the object.

However, if the threshold ratio of portions that do not include a part of the object is not reached, each portion of the object may be compressed according to the first compression method.

In 1010, the compressed image data may be stored. Additionally, the compressed image data may include information indicating whether the threshold ratio of portions that do not include a part of the object is reached. Where the threshold is reached and where information (e.g., binary values) is assigned for each portion, the compressed image data may include the information. Note that this information may also be compressed in the compressed image data.

In some embodiments, the compressed image data may store color information usable to recreate the object in a plurality of different colors. For example, the color information may include a map between luminance values and chrominance values for each different color. Thus, the creation of the map described previously may be modified or created for each different color.

In further embodiments, the image data may include a plurality of images. Accordingly, the division, the determination, and the compression may be performed for each image of the plurality of images. However, the mapping between luminance and chrominance may apply to all of the plurality of images.

Figure 10B:
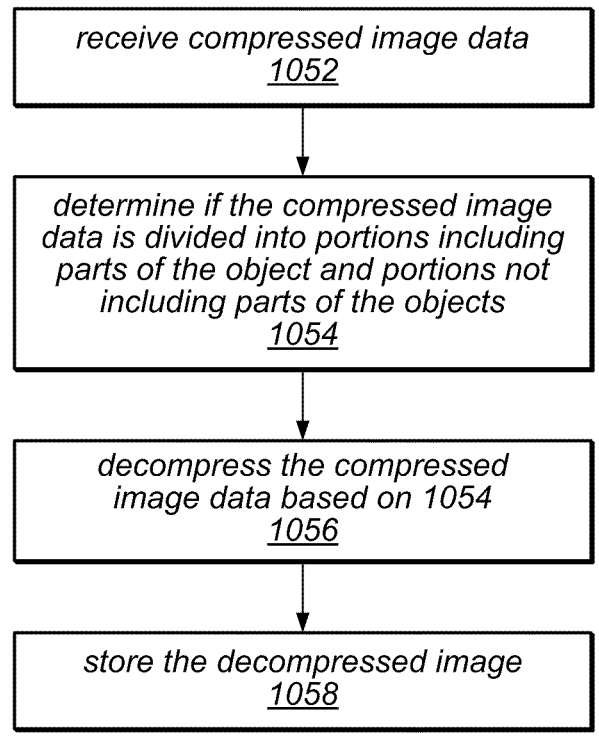

FIG. 10B—Method for Image File Decompression

In the exemplary embodiment shown in FIG. 10B, FIG. 10B illustrates a method for decompressing compressed image data. The method shown in FIG. 10B may be used in conjunction with any of the computer systems or devices shown in the previous Figures, among other devices. In various embodiments, some of the method elements shown may be performed concurrently, in a different order than shown, or may be omitted. Additional method elements may also be performed as desired. As shown, this method may operate as follows.

In 1052, compressed image data may be received. The compressed image data may be received as one or more compressed image files, which may be stored in a memory medium. The compressed image data may be received over a network (e.g., a LAN or WAN, such as the Internet) in a wired or wireless fashion.

The compressed data may be the data compressed previously. For example, the compressed image data may include a first image of an object. As also indicated previously, the compressed image data may include an average chrominance value for each object pixel. Additionally, the compressed data may include a mapping between luminance and chrominance for the first image. Accordingly, the compressed image data may include luminance values for pixels of the first image but may not include chrominance values for pixels of the first image. The mapping may include an average of all chrominance values for a given luminance value. Alternatively, as indicated previously, a first set of luminance values may be mapped to a common chrominance value and a second set of luminance values may be mapped to an interpolated chrominance value.

In 1054, the method may determine if the compressed image data is divided into portions including parts of the object and portions not including parts of the object. For example, the method may determine if the compressed image data comprises information (e.g., a bit or binary value) indicating that the compressed image data is divided into portions including parts of the object and portions not including parts of the object. Additionally, or alternatively, the method may determine if a binary value exists for each portion, and if so, reading the value, e.g., to determine if each portion is a background portion or an object portion.

In 1056, the compressed image data may be decompressed based on said determining. In one embodiment, information indicating which portions include a part of the object may be decompressed. Such information may be used to decompress each portion including a part of the object using a first decompression method. Each portion not including a part of the object may be generated based on background information.

However, if the image data is not divided into portions including parts of the object and portions not including parts of the object, each portion may simply be decompressed using the first decompression method.

Finally, in 1058, the decompressed image may be stored, provided over a network, or displayed, as desired.

In further embodiments, the compressed image data may include color information usable to recreate the object in a plurality of different colors. The color information may include a map between luminance values and chrominance values for each different color. Accordingly, the method may further include receiving input (e.g., over a network, such as the Internet) specifying a color of the plurality of different colors and the decompression described previously may be based on the input and may use the color information. Thus, the decompressed image may include the object in the specified color, e.g., for display, possibly over the Internet.

Additionally, as described previously, the compressed image data may include a plurality of compressed images. Accordingly, the determination and the decompression described previously may be applied to each image of the plurality of images. In one embodiment, the mapping between luminance and chrominance may be applicable to all of the plurality of images.

EMBODIMENTS

The following describes various embodiments of the systems and methods described previously. Note that these embodiments are exemplary only and do not limit the scope of the descriptions herein.

A method for describing the components of an image, wherein each component of a given region of said image is described by one value. The value used to describe said component of a given region of said image may be obtained by averaging the values found at said region of said image.

A method for describing a component of an image as a function of another component of said image. The function may be in the form of a one-to-one mapping. One of the chrominance components may be expressed as a function of the luminance component. The one-to-one mapping may be stored in the form of an array. Given said array, one component can be recovered from said array (the recovered component) using another component as an index (the indexing component). The luminance component may be used to index said array so as to recover one of the chrominance components. An element of said array at a given index may be obtained by averaging all component values of said image associated with said index. If no component values are associated with said index, said element at said index may be obtained by either extending or interpolating the neighboring elements at said array. Some elements of said array may be equal to a constant/fixed value while other elements of said array are given by the interpolation of two values. For example, in one embodiment, the first M elements of said array may be given by the interpolation of two values and the rest of the elements of said array may be equal to a constant/fixed value.

An image compression system, where the input image is segmented into a number of portions, wherein each portion consists of a fixed-number of samples. The portion may be classified as being a background portion—all samples within said portion belong to the background—or an object portion—one or more samples within said portion belong to the object. A 1-bit flag may be assigned to each portion to indicate whether the portion is object or background. These flags may be stored as part of the compressed file. The flags containing the background/object classification may be further compressed resulting in compressed flags. Said compressed flags may be stored as part of the compressed file.

An image compression system where the chrominance components of the object are described previously. Furthermore, said description for the chrominance components can further be compressed before transmission as part of the compressed file.

A file format for image storage wherein said file contains one or more chrominance components corresponding to one or more colors for the same region of said image. An image decoder designed to read in a file compressed as described previously and recover an output image. The color of a given region of said image may be selectable according to a command. The number of selections may depend on the number of colors available in the file.

A file format storing multiple images of the same object. The luminance component of each image can be separately accessed. The same chrominance components may be shared by all images. An image decoder designed to read in a file with the format specified previously and recover one of the multiple stored images. The particular image may be selectable according to a command. The image may be reconstructed according to the selected luminance information, which is combined with the chrominance information shared by all images.

APPLICATIONS

As described previously, various embodiments of the present invention relate to techniques for the compression of digital images, and may be particularly well suited for product presentation in typical e-commerce applications. As described previously, image compression may be implemented using background marking, color quantization, and/or luminance controlled chrominance curves. The techniques described herein can lead to substantial reduction in storage requirement with respect to current compression standards.

Although the previous embodiments have been described in considerable detail, numerous variations and modifications will become apparent to those skilled in the art once the previous disclosure is fully appreciated. It is intended that the following claims be interpreted to embrace all such variations and modifications.

We claim:

1. A method for compressing image data, comprising:
   receiving the image data, wherein the image data comprises a first image of an object;
   creating a mapping between luminance and chrominance for the first image;
   dividing the first image into portions;
   for each portion, determining whether the portion includes a part of the object;
   compressing the image data based on said determining, wherein the compressed image data comprises luminance values for pixels of the first image and does not comprise chrominance values for pixels of the first image, and wherein said compressing uses the mapping;

wherein, if a compression condition is met, said compressing is performed according to a first compression scheme, wherein, in the first compression scheme:
portions including a part of the object are compressed according to a first compression method; and
portions not including a part of the object are discarded, wherein background information is stored for the portions not including a part of the object;

wherein, if the compression condition is not met, said compressing is performed according to a second compression scheme, wherein, in the second compression scheme:
each portion of the first image is compressed according to the first compression method; and storing the compressed image data.

2. The method of claim 1, further comprising:
determining a coding cost associated with the first compression scheme and the second compression scheme;
wherein said compressing is performed according to the first compression scheme when the coding cost of the first compression scheme is lower than the coding cost of the second compression scheme;
wherein said compressing is performed according to the second compression scheme when the coding cost of the second compression scheme is lower than the coding cost of the first compression scheme.

3. The method of claim 2, wherein said determining the coding cost comprises compressing the image data according to the first compression scheme and compressing the image data according to the second compression scheme.

4. The method of claim 1, wherein the compression condition comprises a threshold ratio of portions that do not include a part of the object is reached, wherein the first compression scheme is used if the threshold ratio of portions that do not include a part of the object is reached, wherein the second compression scheme is used if the threshold ratio of portions that do not include a part of the object is not reached.

5. The method of claim 4, wherein the threshold ratio is between the number of portions that do not include a part of the object and the total number of portions.

6. The method of claim 1, wherein, in the first compression scheme, the method further comprises, for each portion, assigning a binary value based on said determining;
wherein said compressing the image data comprises including the binary value for each portion.

7. The method of claim 1, wherein the portions comprise evenly divided rectangles of the first image.

8. The method of claim 1, wherein the first image comprises object pixels and background pixels, wherein, using the first compression method, portions are compressed by assigning an average chrominance value for each object pixel of the respective portion.

9. The method of claim 1, wherein said creating the mapping comprises averaging all chrominance values for a given luminance value.

10. The method of claim 9, wherein, where a luminance value does not occur in the image data, a chrominance value is assigned via interpolation or extrapolation.

11. The method of claim 1, wherein a first set of luminance values are mapped to a common chrominance value and wherein a second set of luminance values are mapped to an interpolated chrominance value.

12. The method of claim 1, wherein the image data comprises a plurality of images, wherein said dividing, said determining, and said compressing is performed for each image of the plurality of images, and wherein the mapping between luminance and chrominance applies to the plurality of images.

13. The method of claim 1, wherein the compressed image data stores color information usable to recreate the object in a plurality of different colors.

14. The method of claim 13, wherein the color information comprises a map between luminance values and chrominance values for each different color.

15. The method of claim 1, further comprising:
storing information indicating whether the compression condition is met.

16. The method of claim 1, wherein, in the first compression scheme, said compressing comprises compressing information indicating which portions include a part of the object.

17. The method of claim 1, wherein the compressed image data stores text and/or graphic information that can be displayed on top of the first image.

18. A method for decompressing compressed image data, comprising:
receiving the compressed image data, wherein the compressed image data comprises a first image of an object;
determining if the compressed image data is divided into portions including parts of the object and portions not including parts of the object;
decompressing the compressed image data based on said determining,
wherein if the image data is divided into portions including parts of the object and portions not including parts of the object:
each portion including a part of the object is decompressed using a first decompression method, wherein the compressed image data comprises a mapping between luminance and chrominance for the first image, wherein the compressed image data comprises luminance values for pixels of the first image and does not comprise chrominance values for pixels of the first image, and wherein the first decompression method uses the mapping;
each portion not including a part of the object is generated based on background information;
wherein if the image data is not divided into portions including parts of the object and portions not including parts of the object:
the image data are decompressed using the first decompression method;
storing the decompressed image.

19. The method of claim 18, wherein said determining if the compressed image data is divided into portions comprises reading a binary value for each portion.

20. The method of claim 18, wherein the portions comprise evenly divided rectangles of the first image.

21. The method of claim 18, wherein the first image comprises object pixels and background pixels, wherein the compressed image data comprises an average chrominance value for each object pixel.

22. The method of claim 18, wherein the mapping comprises an average of all chrominance values for a given luminance value.

23. The method of claim 18, wherein a first set of luminance values are mapped to a common chrominance value and wherein a second set of luminance values are mapped to an interpolated chrominance value.

24. The method of claim 18, wherein the compressed image data comprises a plurality of compressed images, wherein said determining and said decompressing is performed for each image of the plurality of images, and wherein the mapping between luminance and chrominance applies to the plurality of images.

25. The method of claim 18, wherein the compressed image data further comprises color information usable to recreate the object in a plurality of different colors.

26. The method of claim 25, further comprising:
receiving input specifying a color of the plurality of different colors;
wherein said decompressing the compressed image uses the color information and is based on the input, and wherein the decompressed image comprises the object in the specified color.

27. The method of claim 25, wherein the color information comprises a map between luminance values and chrominance values for each different color.

28. The method of claim 18, wherein the compressed image data comprises information indicating whether the compressed image data is divided into portions including parts of the object and portions not including parts of the object, wherein said decompressing is performed based on the information.

29. The method of claim 18, wherein, if the image data is divided into portions including parts of the object and portions not including parts of the object, said decompressing comprises decompressing information indicating which portions include a part of the object.

30. The method of claim 18, wherein the compressed image data stores text and/or graphic information that can be displayed on top of the first image.

31. The method of claim 18, wherein the first image comprises object pixels and background pixels, wherein, if the image data is divided into portions including parts of the object and portions not including parts of the object, said decompressing comprises:
utilizing a second image to serve as background of the decoded image, wherein said utilizing comprises, for each background pixel of the first image, utilizing a pixel of the second image from a corresponding pixel location.

32. A non-transitory computer accessible memory medium storing program instructions for compressing image data, wherein the program instructions are executable by a processor to:
receive the image data, wherein the image data comprises a first image of an object;
create a mapping between luminance and chrominance for the first image;
divide the first image into portions;
for each portion, determine whether the portion includes a part of the object;
compress the image data based on said determining, wherein the compressed image data comprises luminance values for pixels of the first image and does not comprise chrominance values for pixels of the first image, and wherein said compressing uses the mapping;
wherein, if a compression condition is met, said compressing is performed according to a first compression scheme, wherein, in the first compression scheme:
portions including a part of the object are compressed according to a first compression method; and
portions not including a part of the object are discarded, wherein background information is stored for the portions not including a part of the object;
wherein, if the compression condition is not met, said compressing is performed according to a second compression scheme, wherein, in the second compression scheme:
each portion of the first image is compressed according to the first compression method; and
store the compressed image data.

33. The non-transitory computer accessible memory medium of claim 32, wherein the program instructions are further executable to:
determine a coding cost associated with the first compression scheme and the second compression scheme;
wherein said compressing is performed according to the first compression scheme when the coding cost of the first compression scheme is lower than the coding cost of the second compression scheme;
wherein said compressing is performed according to the second compression scheme when the coding cost of the second compression scheme is lower than the coding cost of the first compression scheme.

34. The non-transitory computer accessible memory medium of claim 33, wherein said determining the coding cost comprises compressing the image data according to the first compression scheme and compressing the image data according to the second compression scheme.

35. The non-transitory computer accessible memory medium of claim 32, wherein the compression condition comprises a threshold ratio of portions that do not include a part of the object is reached, wherein the first compression scheme is used if the threshold ratio of portions that do not include a part of the object is reached, wherein the second compression scheme is used if the threshold ratio of portions that do not include a part of the object is not reached.

36. The non-transitory computer accessible memory medium of claim 35, wherein the threshold ratio is between the number of portions that do not include a part of the object and the total number of portions.

37. The non-transitory computer accessible memory medium of claim 32, wherein, in the first compression scheme, the method further comprises, for each portion, assigning a binary value based on said determining;
wherein said compressing the image data comprises including the binary value for each portion.

38. The non-transitory computer accessible memory medium of claim 32, wherein the portions comprise evenly divided rectangles of the first image.

39. The non-transitory computer accessible memory medium of claim 32, wherein the first image comprises object pixels and background pixels, wherein, using the first compression method, portions are compressed by assigning an average chrominance value for each object pixel of the respective portion.

40. The non-transitory computer accessible memory medium of claim 32, wherein said creating the mapping comprises averaging all chrominance values for a given luminance value.

41. The non-transitory computer accessible memory medium of claim 40, wherein, where a luminance value does not occur in the image data, a chrominance value is assigned via interpolation or extrapolation.

42. The non-transitory computer accessible memory medium of claim 32, wherein a first set of luminance values are mapped to a common chrominance value and wherein a second set of luminance values are mapped to an interpolated chrominance value.

43. The non-transitory computer accessible memory medium of claim 32, wherein the image data comprises a plurality of images, wherein said dividing, said determining, and said compressing is performed for each image of the plurality of images, and wherein the mapping between luminance and chrominance applies to the plurality of images.

44. The non-transitory computer accessible memory medium of claim 36, wherein the compressed image data stores color information usable to recreate the object in a plurality of different colors.

45. The non-transitory computer accessible memory medium of claim 44, wherein the color information comprises a map between luminance values and chrominance values for each different color.

46. The non-transitory computer accessible memory medium of claim 32, wherein the program instructions are further executable to:
store information indicating whether the condition is met.

47. The non-transitory computer accessible memory medium of claim 32, wherein, in the first compression scheme, said compressing comprises compressing information indicating which portions include a part of the object.

48. The non-transitory computer accessible memory medium of claim 32, wherein the compressed image data stores text and/or graphic information that can be displayed on top of the decoded image.

49. A non-transitory computer accessible memory medium storing program instructions for decompressing compressed image data, wherein the program instructions are executable by a processor to:
receive the compressed image data, wherein the compressed image data comprises a first image of an object;
determine if the compressed image data is divided into portions including parts of the object and portions not including parts of the object;
decompress the compressed image data based on said determining,
wherein if the image data is divided into portions including parts of the object and portions not including parts of the object:
each portion including a part of the object is decompressed using a first decompression method, wherein the compressed image data comprises a mapping between luminance and chrominance for the first image, wherein the compressed image data comprises luminance values for pixels of the first image and does not comprise chrominance values for pixels of the first image, and wherein the first decompression method uses the mapping;
each portion not including a part of the object is generated based on background information;
wherein if the image data is not divided into portions including parts of the object and portions not including parts of the object:
the image data are decompressed using the first decompression method;
store the decompressed image.

50. The non-transitory computer accessible memory medium of claim 49, wherein said determining if the compressed image data is divided into portions comprises reading a binary value for each portion.

51. The non-transitory computer accessible memory medium of claim 49, wherein the portions comprise evenly divided rectangles of the first image.

52. The non-transitory computer accessible memory medium of claim 49, wherein the first image comprises object pixels and background pixels, wherein the compressed image data comprises an average chrominance value for each object pixel.

53. The non-transitory computer accessible memory medium of claim 49, wherein the mapping comprises an average of all chrominance values for a given luminance value.

54. The non-transitory computer accessible memory medium of claim 49, wherein a first set of luminance values are mapped to a common chrominance value and wherein a second set of luminance values are mapped to an interpolated chrominance value.

55. The non-transitory computer accessible memory medium of claim 49, wherein the compressed image data comprises a plurality of compressed images, wherein said determining and said decompressing is performed for each image of the plurality of images, and wherein the mapping between luminance and chrominance applies to the plurality of images.

56. The non-transitory computer accessible memory medium of claim 49, wherein the compressed image data further comprises color information usable to recreate the object in a plurality of different colors.

57. The non-transitory computer accessible memory medium of claim 56, wherein the program instructions are further executable to:
receive input specifying a color of the plurality of different colors;
wherein said decompressing the compressed image uses the color information and is based on the input, and wherein the decompressed image comprises the object in the specified color.

58. The non-transitory computer accessible memory medium of claim 56, wherein the color information comprises a map between luminance values and chrominance values for each different color.

59. The non-transitory computer accessible memory medium of claim 49, wherein the compressed image data comprises information indicating whether the compressed image data is divided into portions including parts of the object and portions not including parts of the object, wherein said decompressing is performed based on the information.

60. The non-transitory computer accessible memory medium of claim 49, wherein, if the image data is divided into portions including parts of the object and portions not including parts of the object, said decompressing comprises decompressing information indicating which portions include a part of the object.

61. The non-transitory computer accessible memory medium of claim 49, wherein the compressed image data stores text and/or graphic information that can be displayed on top of the decoded image.

62. The non-transitory computer accessible memory medium of claim 49, wherein the first image comprises object pixels and background pixels, wherein, if the image data is divided into portions including parts of the object and portions not including parts of the object, said decompressing comprises:
utilizing a second image to serve as background of the decoded image, wherein said utilizing comprises, for each background pixel of the first image, utilizing a pixel of the second image from a corresponding pixel location.

* * * * *